(12) United States Patent
Nakazawa

(10) Patent No.: US 7,255,274 B2
(45) Date of Patent: Aug. 14, 2007

(54) DATA EXCHANGING SYSTEM, DEVICE, AND METHOD, ALL UTILIZING IC CHIP

(75) Inventor: Tsutomu Nakazawa, Isesaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 259 days.

(21) Appl. No.: 10/982,362

(22) Filed: Nov. 5, 2004

(65) Prior Publication Data
US 2005/0098630 A1    May 12, 2005

(30) Foreign Application Priority Data
Nov. 6, 2003    (JP) .............................. 2003-377324

(51) Int. Cl.
G06K 7/08    (2006.01)
(52) U.S. Cl. ..................... 235/451; 235/492
(58) Field of Classification Search ................ 235/451, 235/487, 492
See application file for complete search history.

(56) References Cited

U.S. PATENT DOCUMENTS

| | | | | |
|---|---|---|---|---|
| 5,691,525 A | * | 11/1997 | Aoki et al. ................. | 235/379 |
| 5,740,369 A | * | 4/1998 | Yokozawa et al. .......... | 709/217 |
| 5,831,547 A | * | 11/1998 | Ohtsuki et al. ........... | 340/10.41 |
| 5,877,484 A | * | 3/1999 | Hirose ........................ | 235/382 |
| 6,070,146 A | * | 5/2000 | Mimata ....................... | 705/13 |
| 6,194,993 B1 | * | 2/2001 | Hayashi et al. .......... | 340/10.34 |

FOREIGN PATENT DOCUMENTS

JP    2002-140735    5/2002

* cited by examiner

*Primary Examiner*—Daniel Stcyr
(74) *Attorney, Agent, or Firm*—Osha Liang LLP

(57) ABSTRACT

A system for collecting data using a non-contact IC chip to manage the data using a computer. An IC chip sends data in a non-contact manner to a reader. The reader receives and stores the data in a memory. When an IC chip of a kind different from the IC chip is present near the reader, the reader sends the data stored in the memory to that IC chip by radio. The data received by the IC chip is supplied to a computer. The reader remains in a stand-alone setting and exchanges data with an IC chip.

4 Claims, 7 Drawing Sheets

DATA EXCHANGING SYSTEM, DEVICE, AND METHOD, ALL UTILIZING IC CHIP

CROSS-REFERENCE TO RELATED APPLICATIONS

The entire disclosure of Japanese Patent Application No. 2003-377324 including specification, claims, drawings and abstract is incorporated herein by reference.

BACKGROUND OF THE INVENTION

1. Field of the Invention

The present invention relates to a data exchanging system, device, and method, and in particular to a system and device for exchanging data by radio.

2. Description of the Related Art

A card having a data exchanging function by radio has been developed and used in a station gate and so forth. In a system utilizing such a card, an IC chip having a receiving antenna is built in to a card, a reader installed as an infrastructure at a station gate transmits a weak electric wave, and the card, when placed within a predetermined range, returns the IC chip's unique information to the reader.

With this system, a user can pass through a gate by merely placing his/her card near the reader, while a reader manager can process collected data statistically or in any desired manner to obtain an idea of the situation regarding users to be utilized in improvement of the system and its convenience, merely by connecting the reader to a server computer.

However, in order to read the unique information sent from an IC chip using a reader and to input the read information into a server computer to be statistically processed in a desired manner, the reader must be connected to the server computer. Meeting this requirement results in increase of costs whether a new system is developed or an existing system is modified. Further, for a system having a portable reader, rather than a fixed one, the portability of the reader may be deteriorated when the reader is physically connected to a computer system.

SUMMARY OF THE INVENTION

The present invention provides a system, a device, and a method for readily extracting IC chip data read using a reader, from the reader, and for supplying the data to a computer, so that the data collected using the reader is efficiently utilized.

According to one aspect of the present invention, there is provided a data exchanging system, comprising: a first IC chip; a second IC chip different from the first IC chip; and a reader for exchanging data with the first IC chip and the second IC chip, respectively. In the data exchanging system, the first IC chip has a first receiving means for receiving an electric wave from the reader, power generating means for performing self-energizing power generation using the received electric wave, first memory means for storing data, and first radio output means for receiving a power source voltage from the power generating means to output by radio the data stored in the first memory means to the reader. The second IC chip has second receiving means for receiving data from the reader, and second memory means for storing a data group. The reader has identifying means for identifying whether an IC chip with which data is exchanged is the first IC chip or the second IC chip, reader-side receiving means for receiving data sent by radio from the first IC chip when an IC chip relative to which data is exchanged is the first IC chip, reader-side memory means for storing the data, and reader-side radio output means for outputting by radio the data stored in the reader-side memory means to the second IC chip when an IC chip relative to which data is exchanged is the second IC chip.

In the present invention, the reader exchanges data by radio, that is, in a non-contact manner, with a first IC chip and a second IC chip, respectively. These IC chips operate differently depending on the kind thereof and/or an instrument into which such an IC chip is built. That is, with respect to a first IC chip, the reader receives data from the first IC chip and stores the received data in its memory means. When there are two or more first IC chips present, data items sent from the respective first IC chips are sequentially stored in the memory means.

With respect to a second IC chip, on the other hand, the reader outputs by radio the data or data group stored in its memory means to the second IC chip, differently from the case with a first IC chip. With this arrangement, the second IC chip can receive data stored in the reader, which is data on a first IC chip, and the data can be input to a computer when the second IC chip is desirably connected to the computer.

According to the present invention, connection of the reader to a computer system is unnecessary to read the data collected using the reader because the collected data is read out using a second IC chip.

According to another aspect of the present invention, there is provided a data exchanging device for exchanging data with an IC chip. The data transmission receiving device comprises identifying means for receiving identification data from the IC chip to identify a kind of the IC chip; receiving means for receiving, when the identifying means identifies the IC chip as the first IC chip, data sent by radio from the first IC chip; memory means for storing the data received; and transmission means for sending by radio, when the identifying means identifies the IC chip as a second IC chip which is different from the first IC chip, the data stored in the memory means to the second IC chip.

In the present invention, when a data exchange party is a first IC chip, the data on the first IC chip is collected, while, when a data exchange party is a second IC chip, the collected data is sent by radio to the second IC chip, so that the data collected using the data exchanging device can be supplied via a second IC chip to a computer or the like.

According to still another aspect of the present invention, there is provided a method for exchanging data among a first instrument into which a first IC chip is built, a second instrument into which a second IC chip different from the first IC chip is built, and a reader. The method comprises the steps of: sending an electric wave from the reader; sending by radio from the first instrument, when the first instrument receives the electric wave, information for identifying the first IC chip or the first instrument to the reader; sending from the reader, a data transmission request command in accordance with the information sent from the first instrument; sending by radio from the first instrument, data stored in an internal memory in response to the data transmission request command;

receiving by the reader, the data sent from the first instrument to store in the internal memory; sending by radio from the second instrument, when the second instrument receives the electric wave, information for identifying the second IC chip or the second instrument to the reader; sending by radio from the reader, the data stored in the internal memory, in response to the information sent from the second instrument; and receiving by the second instrument, the data sent from the reader to store in an internal memory and also to send the data to a computer.

The present invention will be more clearly understood from the following description regarding embodiments of the present invention. However, the scope of the present invention is not limited to the following embodiment in any way.

BRIEF DESCRIPTION OF THE DRAWINGS

A preferred embodiment of the present invention will be described in detail based on the following figures, wherein.

DESCRIPTION OF THE PREFERRED EMBODIMENTS

An embodiment of the present invention will be described below with reference to the accompanied drawings.

Figure 1:
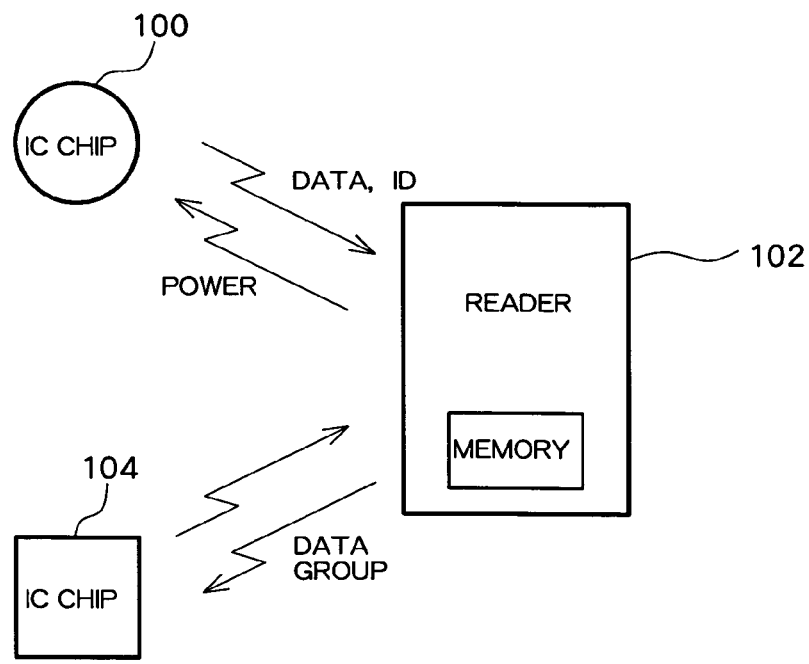
FIG. 1 is a diagram illustrating a concept of a system according to an embodiment of the present invention.

FIG. 1 is a diagram illustrating a concept of a system according to this embodiment. This system comprises an IC chip 100, a reader 102, and an IC chip 104. The IC chip 100 and the IC chip 104 are IC chips to be built in media or instruments of different kinds. For example, an IC chip 100 may be built in an instrument such as a tag, a card, and a ticket, while an IC chip 104 may be built in a maintenance management instrument, such as a data collecting device. Basic structures of the IC chips 100 and 104 are substantially identical, though these operate differently as, for example, their process programs and unique information stored in their memories are different.

The reader 102 exchanges data between with IC chips 100 and 104, respectively, and has a memory to store and manage the exchanged data. Specifically, with respect to an IC chip 100, the reader 102 receives data sent by radio from an IC chip 100 and stores the data in its memory, while, with respect to an IC chip 104, the reader 102 sends by radio the data regarding an IC chip 100 (unique information on an IC chip 100) and stored in its memory to an IC chip 104.

More specifically, the reader 102 identifies whether a data exchanging party is an IC chip 100 or 104, and thereafter implements data receiving and storing functions in the case that the data exchanging party is an IC chip 100, and data read-out and transmission functions in the case where it is an IC chip 104. In other words, when assuming that the IC chips 100 and 104 are tags, the reader reads information from a tag of a certain kind, and sends to a tag of another kind, information on a different tag, the information being stored in its memory.

It should be noted that it is preferable, in data exchange between an IC chip 100 and the reader 102, for the reader 102 to send a weak electric wave, and for the IC chip 100 to receive and rectify the arriving electric wave, and thereafter initiate self-energizing power generation to generate a power source voltage for its own use. In data transmission from an IC chip 100 to the reader 102, an ID of the IC chip 100 may additionally be sent together with the data.

In data transmission between an IC chip 104 and the reader 102, on the other hand, the reader 102 statistically processes a plurality of data items sent by radio from a plurality of IC chips 102, and stores the results in its memory, and the statistical result is sent to an IC chip 104 later, together with individual data. Alternatively, the statistical result may be sent by radio by itself.

As described above, the reader 102 of the system in this embodiment is not connected to a computer network and remains in a stand-alone setting, and, when an IC chip 104, or an IC chip different from an IC chip 100 from which data should be read, is present within its data exchange coverage area, the reader 102 sends the data stored in its memory by radio to the IC chip 104. Therefore, a system user is required merely to place an IC chip 104, instead of an IC chip 100, near the reader 102 to extract the data (unique information) regarding an IC chip 100, collected using the reader 102. The data on the IC chip 100, which is now held in the IC chip 104, can be input to a computer when the IC chip 104 is connected to the computer system in either a wired or wireless manner.

Figure 2:
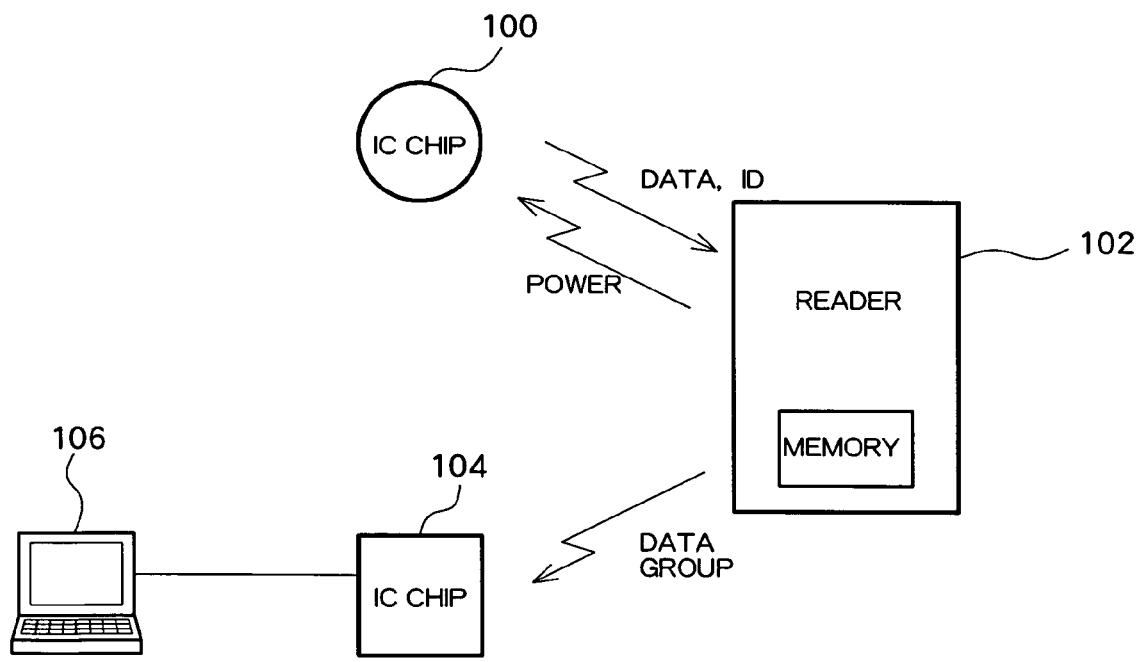
FIG. 2 is a diagram illustrating a concept of another system according to the embodiment.

Referring to FIG. 1, an IC chip 104 can be built in a portable medium or instrument, similar to an IC chip 100. Alternatively, an IC chip 104 may remain connected to the computer 106, as shown in FIG. 2. For a portable reader 102, rather than a fixed one, the data stored in the memory of the reader 102 is sent by radio to an IC chip 104 placed near the reader 102, and thereafter sent to a computer 106.

Figure 3:
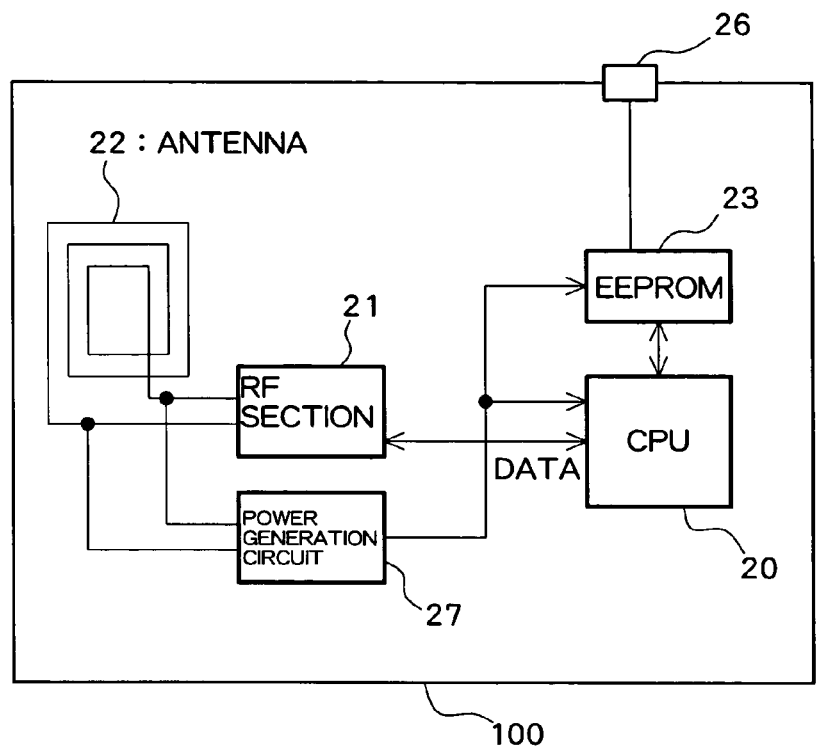
FIG. 3 is a block diagram showing a structure of an IC chip according to the embodiment.

FIG. 3 is a block diagram showing a basic structure of the IC chip 100 shown in FIGS. 1 and 2. Specifically, an antenna 22 in a loop-like shape receives a weak electric wave sent from the reader 102. The power generation circuit 27 rectifies the electric wave signal received by the antenna 22 to generate a power source voltage Vdd in a self-energizing manner, and supplies the generated voltage Vdd to the respective sections of the IC chip 100 to place them in an operable state. An EEPROM 23 stores the data (unique information) of the IC chip 100 itself and an operation program. A CPU 20 reads the stored data from the EEPROM 23 according to the operation program, and outputs the read data to an RF section 21. The EEPROM 23 is connected to an outside interface I/F 26, so that a command for rewriting the content of data stored in the EEPROM 23 can be input. The content of data may include, for example, unique ID of an IC chip 100, an ID for specifying an instrument into which the IC chip 100 is built, and so forth.

The RF section 21 converts the data supplied from the CPU 20 into radio data, and sends the resultant data by radio via the antenna 22. The data sent by radio is received by the reader 102. It should be noted that the electric power generation circuit 27 for self-energizing power generation in FIG. 3 may be substituted by a primary or secondary cell.

Figure 4:
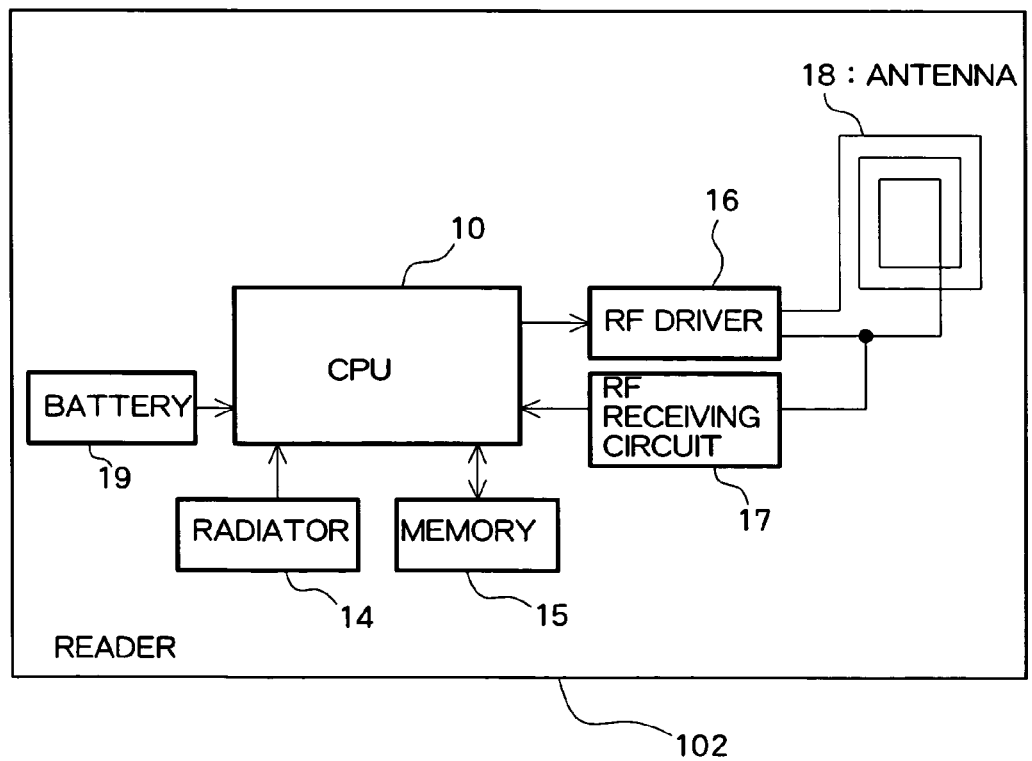
FIG. 4 is a block diagram showing a structure of a reader according to the embodiment.

FIG. 4 is a diagram showing a basic structure of the reader 102 shown in FIGS. 1 and 2. Specifically, in response to a command from an CPU 10, an RF driver 16 outputs a resonance waveform to an antenna 18 to output a weak electric wave (for example, about 10 mW) via the antenna 18. In the case where the weak electric wave is received by an IC chip 100, the IC chip 100 returns its data by radio, as described above.

The data from the IC chip 100 is received via the antenna 18, and forwarded to an RF receiving circuit 17. The RF receiving circuit 17 converts the data into a digital signal and then demodulates before output to the CPU 10. The CPU 10 identifies the data exchanging party as an IC chip 100, and stores the data sent by radio from the IC chip 100 and demodulated in a memory 15. In the case where two or more IC chips 100 are present, these IC chips 100 sequentially send their data, and the CPU 10 in the IC chip 102 sequentially stores the data, sequentially arriving from the IC chips 100, in the memory 15. In the above, present time data, which is available according to a clock CLK from a radiator 14, may additionally be stored together with the data. A clock CLK of the radiator 14 may serve also as a system clock.

Meanwhile, in the case where the CPU 10 identifies the data exchanging party as an IC chip 104, the CPU 10 reads the data stored in the memory 15, and outputs the data to an RF driver 16. The RF driver 16 modulates the data before output to the antenna 18, so that the resultant data is sent by radio via the antenna 18 to the IC chip 104. It should be noted that the identification by the CPU 10, of a data exchange party is made based on a response command sent from either IC chip 100 or 104.

The reader 102 operates using a power source voltage supplied from a built-in battery 19 or external power source. Alternatively, the reader 102 may be constructed such that it implements self-energizing power generation using an electric wave supplied from the outside, similar to the IC chip 100.

The structure of an IC chip 104 is basically identical to that of an IC chip 100 except that the IC chip 104 stores the data sent from a reader 102, instead of storing its unique information in the EEPROM 23 or other memories to send later to the reader 102. That is, the data sent by radio from the reader 102 is received via the antenna 22, converted into a digital signal and demodulated in the RF section 21, and supplied to the CPU 20. The CPU 20 then stores the supplied data in the EEPROM 23. The data stored in the EEPROM 23 of the IC chip 104, that is, data on an IC chip 100, is supplied via the outside interface 26 to a computer.

Figure 5:
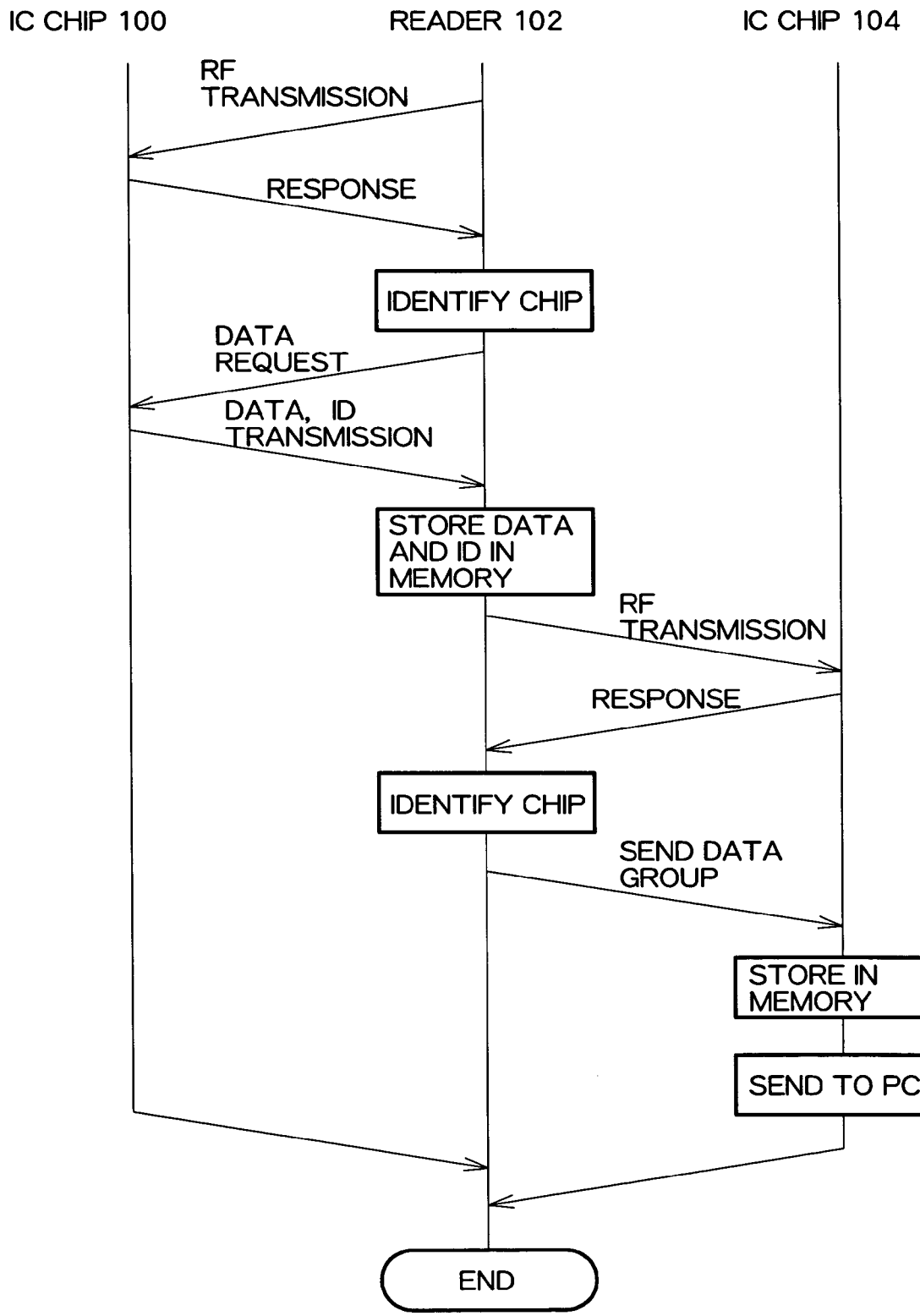
FIG. 5 is a diagram for explaining a flow of the process shown in FIG. 1.

FIG. 5 shows a flow of operation by the system according to this embodiment. As described above, the reader 102 sends a weak electric wave via the antenna 18, and an IC chip 100 receives the electric wave via the antenna when being placed near the reader 100. The IC chip 100 then implements self-energizing power generation using the power generation circuit 27, and activates the CPU 20. The CPU 20 sends a response command via the RF section 21 and the antenna 22 to the reader 102. The CPU 10 of the reader 102 responsive to the response command from the IC chip 100 identifies the data exchanging party as an IC chip 100, but not an IC chip 104. Having identified the kind of IC chip for data exchange, the reader 102 sends a data transmission request command to the IC chip 100. In response to the data transmission request command sent from the reader 102, the CPU 20 of the IC chip 100 returns the data and ID stored in the EEPROM 23 to the reader 102. The data may include, in a station gate case, for example, boarding section data, price data, user specification data, and so forth.

The reader 102 receives the data or ID sent by radio from the IC chip 100 and stores them in the memory 15. This operation is repetitively performed every time an IC chip 100 is placed near the reader 102. Accordingly, the data sent by radio from a plurality of IC chips 100 is sequentially stored in the memory 15.

Meanwhile, when an IC chip 104 is placed near the reader 102, the IC chip 104 receives via its antenna 22 a weak electric wave sent by the reader 102. Then, the CPU 20 of the IC chip 104 returns a response command by radio to the reader 102, so that the reader 102 identifies the kind of IC chip 104 based on the response command. Namely, the CPU 10 of the reader 102 identifies the data exchanging party as an IC chip 104, but not an IC chip 100, reads out data or data group stored in the memory 15, and sends the data or data group by radio via the RF driver 16 and antenna 18 to the IC chip 104.

The data to be sent to the IC chip 104 is basically the data and ID collected from each IC chip 100. Collection time data and a result of a predetermined statistical process using the data may be additionally included. The predetermined statistical process to be performed is determined based on the content of the data concerning an IC chip 100. For example, for an IC chip 100 built in a card or ticket for allowing its holder to pass through a station gate, the content of data may include the total number of passengers having passed through the gate, a boarding time spread, a boarding section distribution, and so forth. For an IC chip 100 built in a detector having a sensor, the content of data may include an average, peak, and/or bottom value(s) of detected data. The IC chip 104 receives via the antenna 22 the data sent by radio from the reader 102, stores the received data in its memory, such as an EEPROM, and sends the data stored in the memory to a computer (PC).

As described above, in the system in this embodiment, the reader 102 for reading the data on an IC chip 100 is constructed so as to remain in a stand-alone setting, and when an IC chip 104 which is an IC chip of a kind different from the IC chip 100 is present nearby, to send the data stored therein to the IC chip 104, instead of reading data from the IC chip 104. Therefore, with this arrangement, input of the data on an IC chip 100, collected using the reader 102, to a computer network can be readily achieved without connecting the reader 102 to the computer network, that is, without significant modification of the hardware structure of the reader 102.

In the following, a system according to this embodiment will be more specifically described.

Initially, an example in which the system according to this embodiment is applied to an entry and leaving management system will be described.

Figure 6:
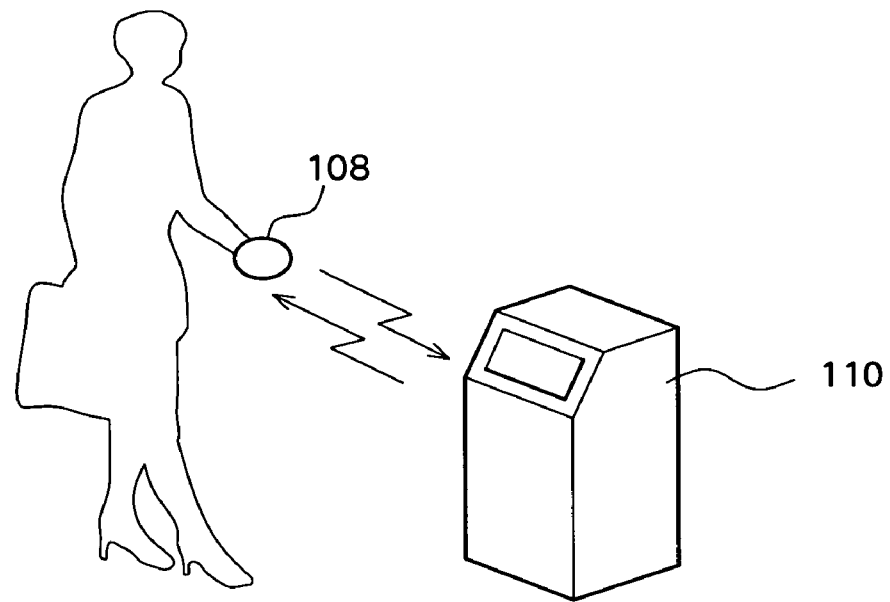
FIG. 6 is a diagram illustrating a concept of application of the system to a gate system.
Figure 7:
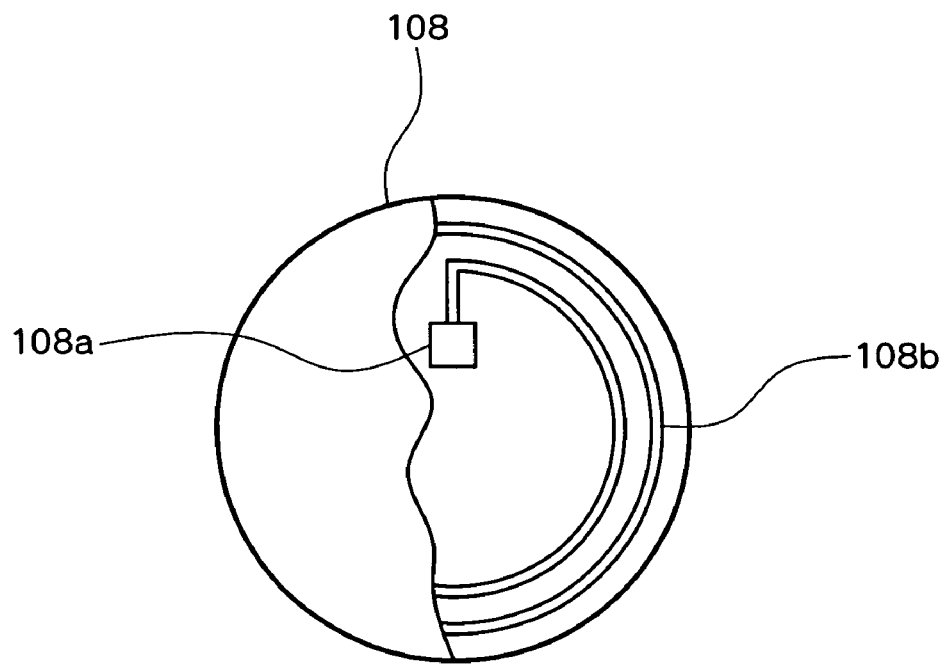
FIG. 7 is a diagram showing a structure of a token shown in FIG. 6.

FIG. 6 is a diagram illustrating a concept of a situation where a user passes through a station gate. In this case, a user carries a token 108 having an IC chip 100 built therein. Naturally, the token 108 is not mandatory, and any similar entry card or ticket may be employed instead. FIG. 7 shows a partial external appearance and a partial interior structure of the token 108. A structure of the token 108 is similar to that shown in FIG. 3, specifically, comprising a chip section 108a including a CPU 20, an RF section 21, and an EEPROM 23, and an antenna 108b wound along the circumference of the circular token 108 while surrounding the chip section 108a. The EEPROM 23 of the token 108 stores the data on the kind of the token 108 itself, that is, price data in this case, together with a security code. Individual user data (for example, a name, an age, an address, and so forth) may additionally be stored.

Referring again to FIG. 6, when a user passing beside the gate places his/her token 108 close to a reader 110, the token 108 receives via its antenna 108b a weak electric wave transmitted from the reader 110. The token 108 then initiates self-energizing power generation using the power generation circuit 27 to place the CPU 20 in an operating state. Thereafter, the CPU 20 sends by radio a command for identifying as a token 108 or an IC chip 100, and then sends by radio the data indicative of the kind of the token 108 (that is, a monetary amount), having been stored in the EEPROM 23, in response to a data transmission request sent from the reader 110. Individual data may additionally be sent by radio together with the token type data.

The reader 110, having received the response command, identified the data exchange party as a token 108, and stores the data sent by radio from the token 108 in the memory 15.

This operation is implemented every time a user passes beside the reader 110, so that data on the respective tokens 108 are sequentially collected. A user carrying no token 108 or a token 108 with a balance insufficient to pay a necessary price may be prevented from passing through the gate by a gate management system connected to the reader 110.

Figure 8:
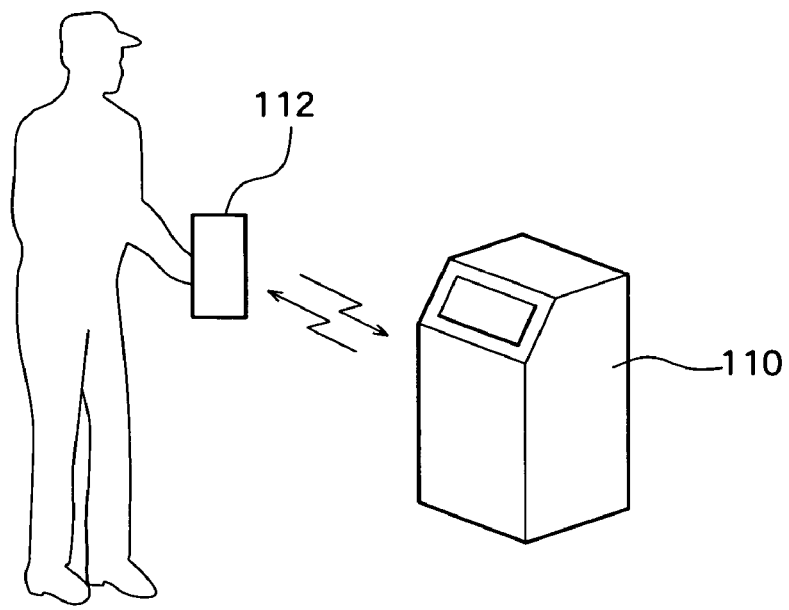
FIG. 8 is a diagram illustrating a concept of application of the system to a gate system.

After the collection of the data regarding tokens 108, as described above, when another user, for example, a maintenance manager, carrying an instrument 112 having an IC chip 104 built therein places the instrument 112 close to the reader 110, as shown in FIG. 8, the IC chip 104 receives via its antenna 22 a weak electric wave sent from the reader 110, and responds by sending a command for identifying as an instrument 112 or IC chip 104, using the CPU 20.

The reader 110, having received the command from the instrument 112, identified the data exchange party as an instrument 112, rather than a token 108, and then sends the data stored in its memory 15 by radio to the instrument 112. The data may concern the kind of the token (a monetary balance) and statistical data relevant to the token (the kinds of tokens and the number of tokes for every kind). Data collection time data, as well as individual data, may additionally be sent together with the token type data. The instrument 112, having received the data sent from the reader 110, stores the received data in its memory. As described above, the data on the token 108, collected using the reader 110, is stored into the instrument 112.

Thereafter, when the maintenance manager connects the instrument 112 to a computer system in either a wired or wireless manner, the data on the reader 110, stored in the memory, that is, data on the token carried by a user passing through the gate, is supplied to the computer. The computer analyzes the input data to obtain an idea concerning which kinds of tokens are used at what frequency.

In the following, an example in which the system in this embodiment is applied to a thermometry system will be described. A body temperature, one of the vital signs directly related to maintenance of a person's life, is measured on a daily basis in a hospital, as well as at home to manage a child's health or the like.

In a hospital, for example, a nurse patrolling at a predetermined time distributes either a mercuric or electric thermometer to a patient, and the patient measures his/her thermometer by himself/herself by placing the thermometer in a predetermined position on his/her body, such as under his/her arm, and returns the thermometer to the patrolling nurse later. The nurse reads and records the measured result in a recording book and later inputs into a computer for collective management.

A mercuric thermometer takes time to measure a temperature, while an electric thermometer tends to show a relatively large error as it employs a prediction method for time reduction. Keeping a recording book, as well as data input into a computer, is troublesome, which increases the burden on a nurse.

In view of the above, in this example, an IC chip 100 having a temperature sensor is built in to an adhesive pad, the adhesive pad is pasted on a subject patient or child to measure his/her temperature, and the patient's or child's temperature data is read using a reader. This can reduce burden in thermometry.

Figure 9:
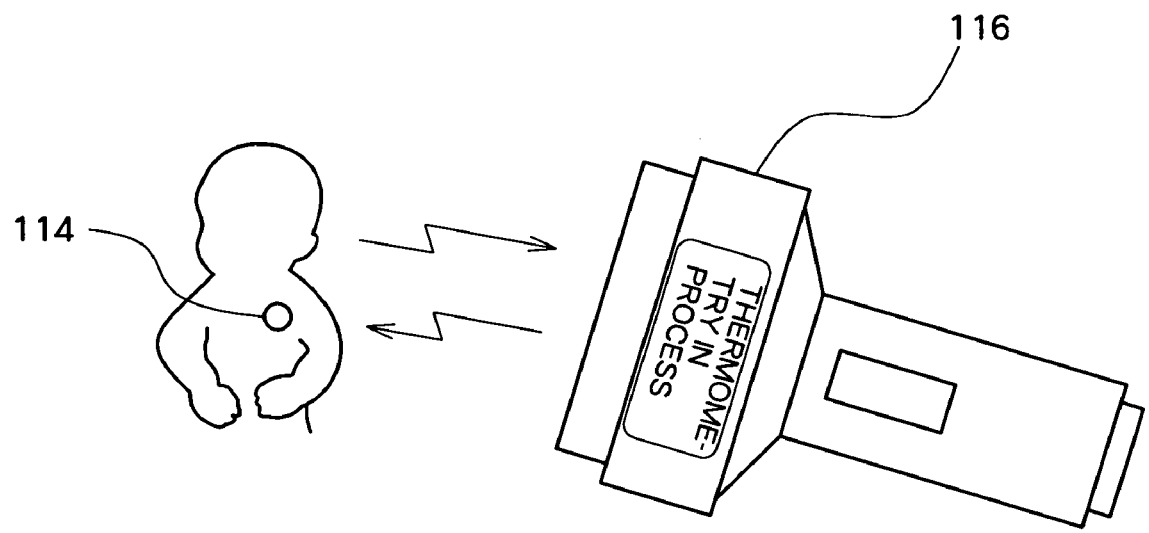
FIG. 9 is a diagram illustrating a concept of application of the system to a thermometry system.
Figure 10:
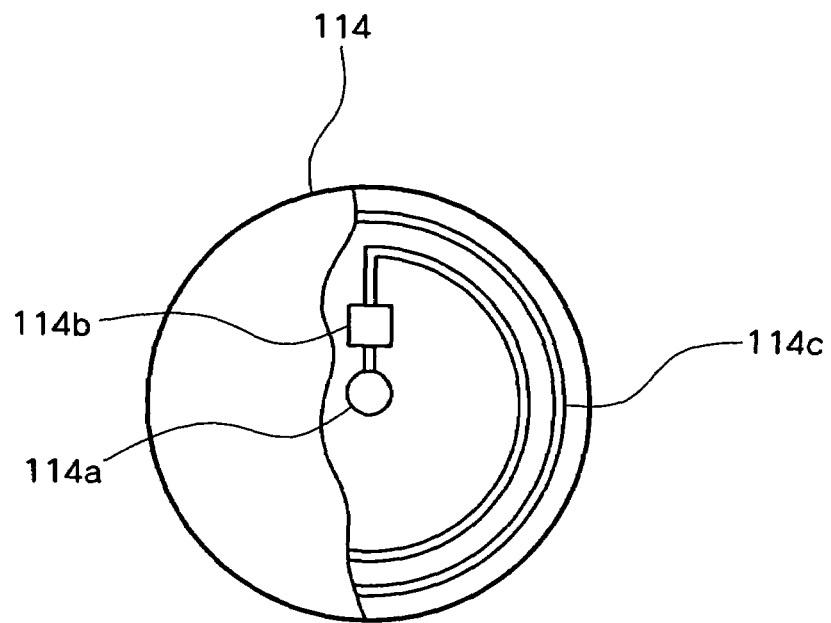
FIG. 10 is a diagram showing a structure of an adhesive pad shown in FIG. 9.

FIG. 9 is a diagram illustrating a concept of measuring temperature using the system of the present invention. Specifically, an IC chip having a temperature sensor is built in to an adhesive pad 114, and the adhesive pad 114 is pasted on a patient (a child in the drawing) at a predetermined position, such as, under his/her arm. FIG. 10 shows a partial external appearance and a partial interior structure of the adhesive pad 114. A temperature sensor 114a is located at a substantial center of the adhesive pad 114 in the manner of being exposed to the outside via the back surface of the adhesive pad 114 where the adhesive sheet is pasted so that the temperature sensor 114a can directly touch a patient's skin when the adhesive pad 114 is pasted on the patient. The temperature data measured using the temperature sensor 114a is stored in the EEPROM of the chip section 114b and sent by radio via the antenna 114c to the outside.

Referring again to FIG. 9, when the reader 116 is placed near the adhesive pad 114 pasted on a patient, the adhesive pad 114 receives a weak electric wave sent from the reader 116, initiates self-energizing power generation, and sends the temperature data (the patient's temperature data) stored in its EEPROM to the reader 116 by radio. The patient's ID may additionally be sent from the adhesive pad 114 together with the temperature data.

In response to a response command from the adhesive pad 114, the reader 116 identified the data exchange party as an adhesive pad 114, receives the temperature data (and the patient's ID) sent from the adhesive pad 114, and stores the data in the memory. The reader 116 may be provided with an LCD so that the received temperature data can be shown on the LCD. In addition, a message "thermometry in process" may also be displayed while the reader 116 is receiving temperature data from the adhesive pad 114.

When temperature of two or more patients is to be measured, such as is in a hospital, the reader 116 sequentially receives the patients' IDs and temperature data sent from the respective adhesive pads 114 pasted on the respective patients, and stores them in the memory. When temperature data of the same patient measured at different times is received, the temperature data may be sequentially stored in a memory to be managed for every patient ID.

Examples of a data group to be stored in the memory are shown below:

Patient ID: 0001

Temperature Data: T1(t1), T2(t2), T3(t3), T4(t4), T5(t5)

Patient ID: 0002

Temperature Data: K1(t1), K2(t2), K3(t3), K4(t4), K5(t5)

In the above, T1 (t1), K1(t1), and so forth, refer to a temperature measured at time t1. The shown data sets are mere examples, and each data set may alternatively include a patient ID, temperature data, and a thermometry time.

Figure 11:
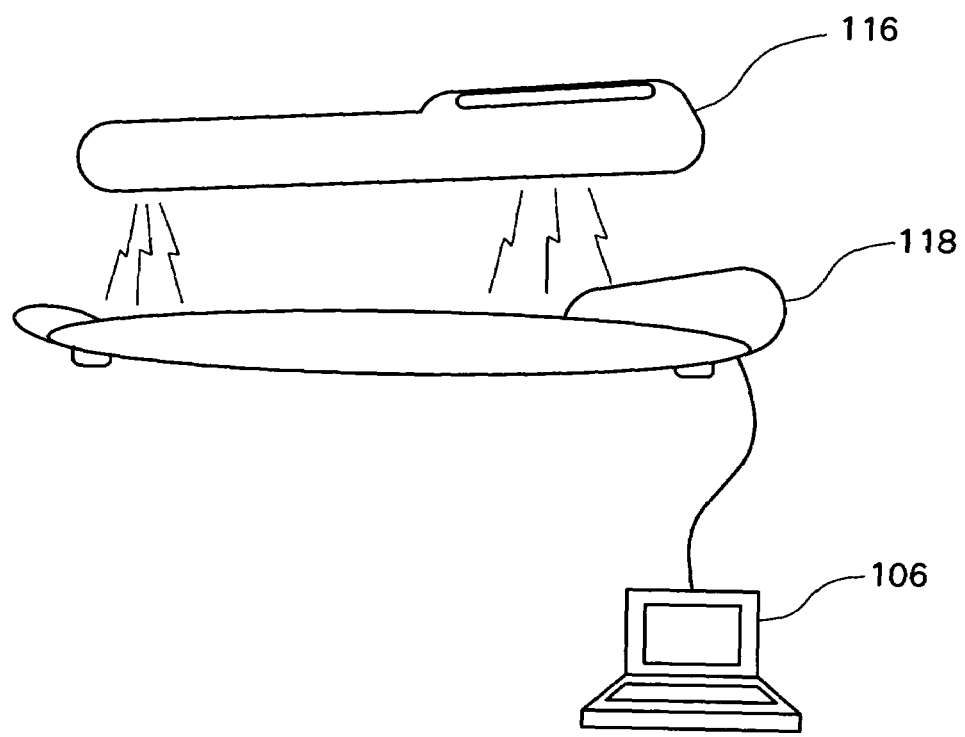
FIG. 11 is a diagram illustrating a concept of application of the system to a thermometry system.

After the collection of a patient's temperature data, as described above, the reader 116 is placed near a holder 118 installed in a predetermined position, as shown in FIG. 11. The holder 118, having an IC chip 104 built therein, receives a weak electric wave from the reader 116, using the IC chip 104, and responds by sending by radio a command for identifying as a holder 118 or an IC chip 104.

The reader 116, having received an ID command from the holder 118, identified the data exchange party as a holder 118, rather than an adhesive pad 114, and sends the patient's ID and temperature data stored in its memory by radio to the holder 118. The holder 118 receives the data sent by radio from the reader 116, and stores them in its memory. The holder 118 further sends the received data to the computer 106 connected thereto in a wired manner. With the above, the data collected using the reader 116, that is, an individual patient's temperature data, is input into the computer 106.

Figure 12:
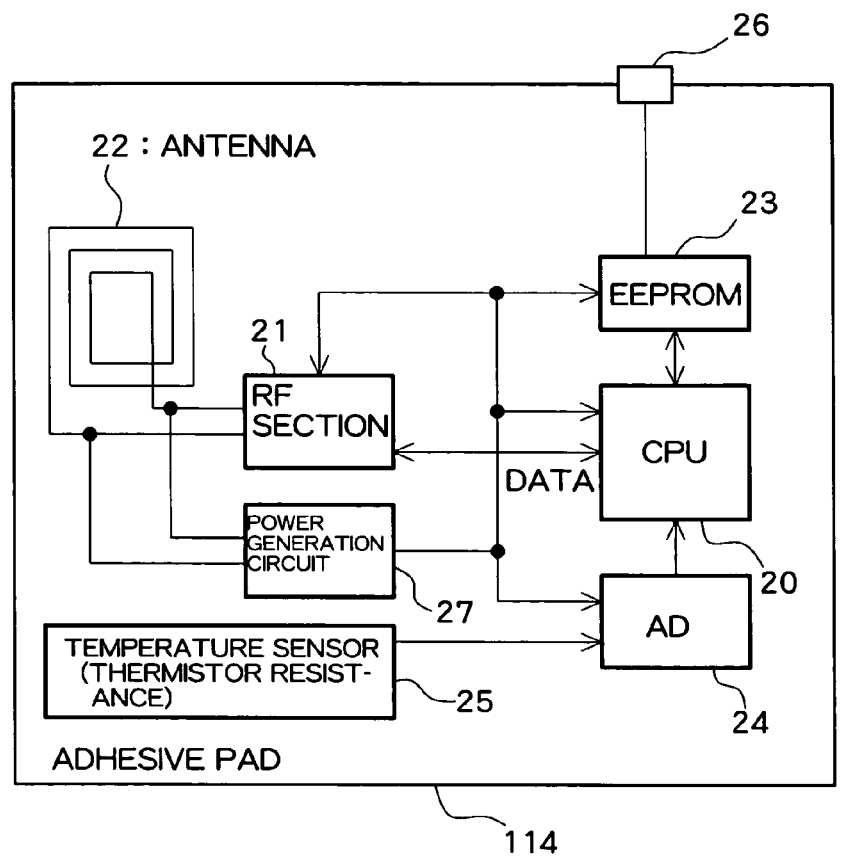
FIG. 12 is a diagram showing a structure of an adhesive pad shown in FIG. 9.
Figure 13:
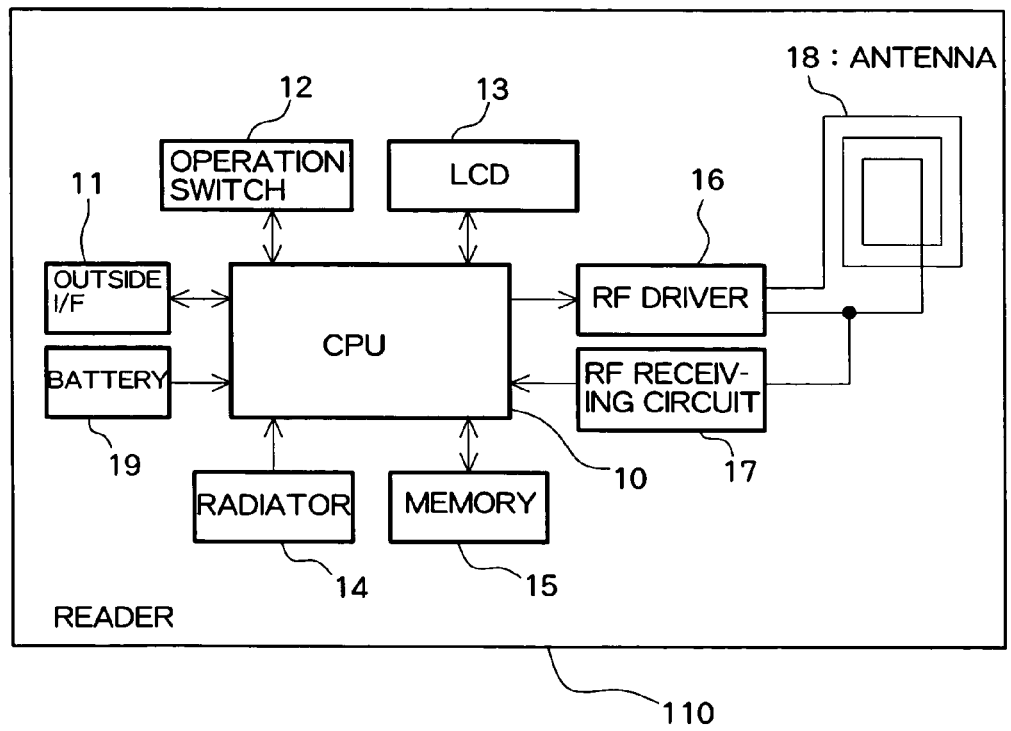
FIG. 13 is a block diagram showing a structure of a reader shown in FIG. 10.

FIG. 12 is a block diagram showing a structure of the adhesive pad 114 according to this example. FIG. 13 is a block diagram showing a structure of the reader 116 according to this example. The structure shown in FIG. 12 differs from that in FIG. 3 in that the temperature sensor 25 and the A/D circuit (AD) 24 are additionally included. The temperature sensor 25 comprises, for example, a thermistor which varies its resistance value according to a patient's temperature and outputs the variation of the resistance value as a voltage value to the A/D 24. The A/D 24 converts the voltage value into a digital value, and outputs the resultant value to the CPU 20. The CPU 20 stores the digital temperature value in the manner of being correlated with the patient's ID in the EEPROM 23. A patient's ID may be written into the EEPROM 23 before or when the adhesive pad 114 is put on the patient.

The structure of FIG. 13 differs from that shown in FIG. 4 in that an operation switch 12, an LCD 13, and an outside interface 11 are additionally included. The operation switch 12 is a switch for activating the CPU 10, the RF driver 16, and the RF receiving circuit 17. Specifically, when the operation switch 12 is turned on, transmission of a weak electric wave via the RF driver 16 and antenna 18 begins. The operation switch 12 is also operated when exchanging data relative to the adhesive pad 114, as well as to the holder 118.

The LCD 13 begins information display when the operating switch 12 is turned on. A message "thermometry in process" may also be displayed on the LCD 13 in response to a command from the CPU 10 while receiving data from the adhesive pad 114. After completion of the data receiving, the temperature data is shown in the form of "37.0° C." or the like, using the data stored in the memory 15.

The outside interface 11 is an interface for connecting the reader 166 to an instrument other than the holder 118. The data stored in the memory 15 can be transmitted via the interface 11 when, for example, an USB interface is directly connected to a personal computer, or the like.

It should be noted that the structure of the holder 118 is basically similar to the structure shown in FIG. 12 except for a temperature sensor 25 and a power generation circuit 27. Specifically, data from the reader 116 is received via the antenna 22 and supplied to the CPU 20, which then stores the received patient's data in the EEPROM 23, or the like. The stored data is sent via the outside interface 26 to a computer 106. The outside interface 26 may be any interface, for example, a USB or IEEE 1394.

As described above, in this example, a patient's temperature data can be collected using the reader 116, and the collected data can be supplied to the computer 106 merely by placing the reader 116 near the holder 118. The computer 106 manages the patient's temperature based on the input data, so that the patient's condition can be known from the history of temperature recorded for every day, every three days, or every week.

It should be noted that the reader 116 may have a structure in which a self-energizing power generation circuit is provided for implementing self-energizing power generation to generate a power source voltage for use by its respective sections, and the data stored in the memory 15 is read and sent by radio to the holder 118. The battery 19 of the reader 116 may be a secondary cell, which is rechargeable using the electricity supplied from the holder 118. In this case, the holder 118 can serve also as a charger for the reader 116 (a charging holder).

As described above, in this embodiment, the readers 102, 110, and 116 are kept in a stand-alone setting, and identify a data exchange party. When the data exchange party is identified as an IC chip 100, the readers 102, 110, and 116 receive data from the IC chip 100. When a data exchange party is identified as IC chip 104, on the other hand, the readers 102, 110, and 116 send the collected data to the IC chip 104. With this arrangement, extraction of the data collected from an IC chip, as well as data input to a computer such as a server computer, can be readily realized without remarkable modification of the hardware structure of the reader.

Alternatively, in this embodiment, a transmission tag and a receiving tag are prepared, and, when a transmission tag is placed near the reader, the reader reads the data on the transmission tag and stores the read data in its memory, and, when a receiving tag is placed near the reader, the reader reads out the data regarding a transmission tag from its memory and sends the data to the receiving tag. With this arrangement, the data collected using the reader can be readily supplied to a computer.

What is claimed is:

1. A data exchanging system, comprising:
a first IC chip that is built into a first portable instrument;
a second IC chip that is different from the first IC chip, and is built into a second portable instrument; and
a reader for exchanging data with the first IC chip and with the second IC chip, respectively;
wherein the first IC chip has
first receiving means for receiving an electric wave from the reader,
power generating means for performing self-energizing power generation using the electric wave received,
first memory means for storing data, and
first radio output means for receiving a power source voltage from the power generating means to output the data stored in the first memory means to the reader by radio,
the second IC chip has
second receiving means for receiving data from the reader, and
second memory means for storing a data group, and the reader has
identifying means for identifying whether an IC chip with which data is exchanged is the first IC chip or the second IC chip,
reader-side receiving means for receiving data sent by radio from the first IC chip when an IC chip with which data is exchanged is the first IC chip,
reader-side memory means for storing the data, and
reader-side radio output means for outputting the data stored in the reader-side memory means to the second IC chip by radio when the IC chip with which data is exchanged is the second IC chip;

wherein the first portable instrument comprises detection means and sends data detected by the detection means to the reader by radio, and the second portable instrument is connected to a computer in a wired or wireless manner and sends the data sent from the reader to the computer by radio; and wherein the first portable instrument comprises a temperature detector for measuring a patient's temperature and sends measured temperature data to the reader by radio, the reader receives the measured temperature data and stores the measured temperature data in the reader-side memory means, and the second portable instrument outputs the measured temperature data sent by radio from the reader to the computer.

2. The system according to claim 1, wherein the reader is in a stand-alone setting in which the reader is not connected to a computer.

3. A data exchanging device for exchanging data with a first IC chip that is built into a first portable instrument and a second IC chip that is built into a second portable instrument, comprising:

identifying means for receiving identification data from one of the first and second IC chips to identify a type of the IC chip;

receiving means for receiving data sent by radio from the IC chip, when the identifying means identifies the IC chip as the first IC chip;

memory means for storing the data received;

transmission means for sending data stored in the memory means to the IC chip by radio, when the identifying means identifies the IC chip as the second IC chip that is different from the first IC chip; and processing means for applying predetermined statistical processing to data items sent by radio from a plurality of first IC chips and sequentially stored in the memory means to output a result of the processing in the memory means, wherein the transmission means sends a process result stored in the memory means to the second IC chip by radio.

4. The device according to claim 3, further comprising: electric wave transmission means for sending an electric wave to the first IC chip, for use in self-energizing power generation by the first IC chip.

* * * * *